(No Model.)
B. F. GILMAN.
PLANT OR TREE PROTECTOR.
No. 502,559. Patented Aug. 1, 1893.
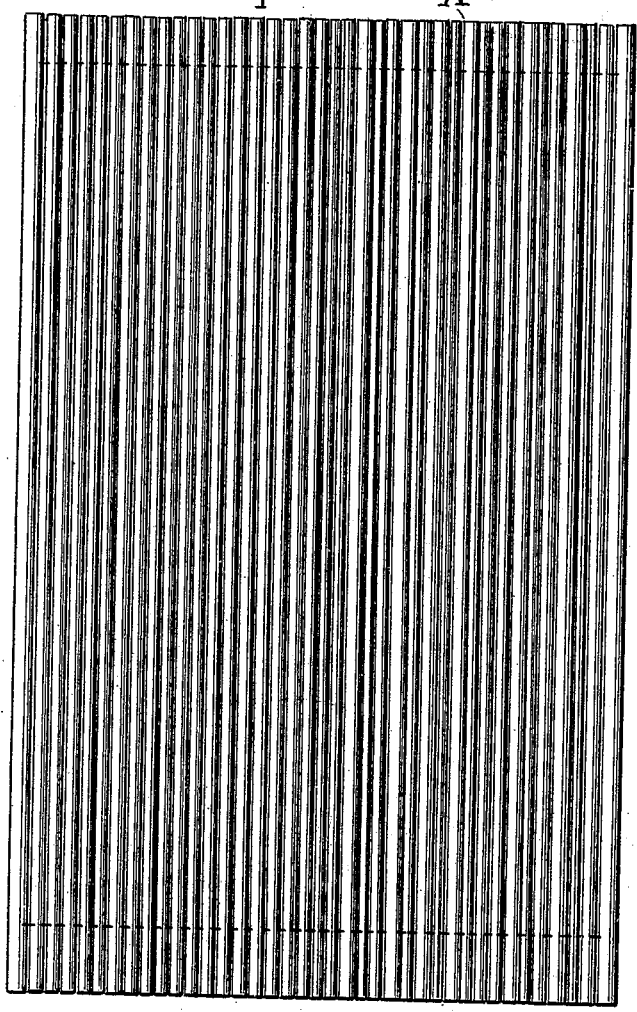
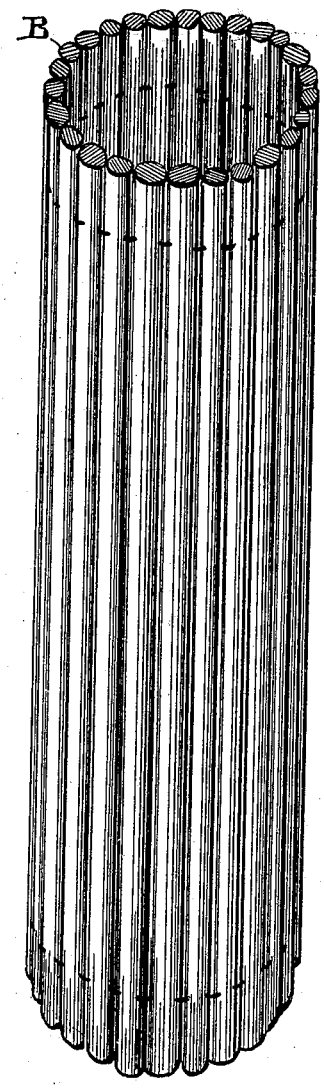

UNITED STATES PATENT OFFICE.

BENJAMIN F. GILMAN, OF SAN FRANCISCO, CALIFORNIA.

PLANT OR TREE PROTECTOR.

SPECIFICATION forming part of Letters Patent No. 502,559, dated August 1, 1893.

Application filed June 24, 1892. Serial No. 437,887. (No model.)

*To all whom it may concern:*

Be it known that I, BENJAMIN F. GILMAN, a citizen of the United States, residing in the city and county of San Francisco, State of California, have invented an Improvement in Plant or Tree Protectors; and I hereby declare the following to be a full, clear, and exact description of the same.

My invention relates to a novel plant or tree protector.

It consists of a peculiar cylindrical casing adapted to surround a young plant or tree, which will be more fully explained by reference to the accompanying drawings, in which—

Figure 1 is a view of the tule spread in the form of a sheet. Fig. 2 is a view in the form of a circular casing ready to surround the plant.

When young plants or trees are set out, it is necessary to protect them from sun, wind, cold, and frost; and if inclosed in approximately tight boxes or cases, these cases must be placed over them each night, and removed in the morning, and with these precautions, the plants grow but slowly. In my invention I take the cylindrical pithy reed known as "tule" or "*Scirpus lacustris*," which grows to the height of ten or twelve feet, and of considerable thickness. These reeds are cut into proper lengths and are then stitched together in sheets A by any suitable or well known stitching apparatus for the purpose until a sheet of sufficient length and width is provided to encircle the young tree or plant when the edges are brought together, and to extend above its upper end, while allowing sufficient length for the casing to be pressed into the ground a short distance so that it will stand alone. These casings B have sufficient interstices between the reeds to allow a free circulation of air about the plant, but they protect it from too great a heat of the sun in the daytime, from cold winds, or from the action of frost at night, and they also protect it from the attacks of insects which appear to have an aversion to entering these casings. It is not necessary to remove the cases during the day because they allow sufficient circulation of air so that the plant will thrive rapidly within them, and when the plant is large enough they can be permanently removed.

Having thus described my invention, what I claim as new, and desire to secure by Letters Patent, is—

A protector for young plants and trees consisting of a cylindrical hollow casing formed of tule reeds stitched together in a sheet with interstices between the reeds for the circulation of air, said sheet having its edges brought together and secured to form a cylinder adapted to encircle the tree or plant, substantially as herein described.

In witness whereof I have hereunto set my hand.

BENJAMIN F. GILMAN.

Witnesses:
S. H. NOURSE,
J. A. BAYLESS.